(12) United States Patent
Chen et al.

(10) Patent No.: US 10,617,208 B2
(45) Date of Patent: *Apr. 14, 2020

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shun-Ho Yang, Kaohsiung (TW); Kai-Wen Yu, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 234 days.

This patent is subject to a terminal disclaimer.

(21) Appl. No.: 15/784,212

(22) Filed: Oct. 16, 2017

(65) Prior Publication Data
US 2018/0295989 A1    Oct. 18, 2018

(30) Foreign Application Priority Data
Apr. 12, 2017    (TW) .............................. 106112318 A

(51) Int. Cl.
*A47B 88/443* (2017.01)
*A47B 88/477* (2017.01)
(Continued)

(52) U.S. Cl.
CPC .......... *A47B 88/443* (2017.01); *A47B 88/447* (2017.01); *A47B 88/477* (2017.01);
(Continued)

(58) Field of Classification Search
CPC ..... A47B 88/443; A47B 88/49; A47B 88/447; A47B 88/477; A47B 88/473;
(Continued)

(56) References Cited

U.S. PATENT DOCUMENTS

| 4,872,734 A | 10/1989 | Rechberg |
| 6,817,685 B2 * | 11/2004 | Lammens ............ A47B 88/493 312/333 |

(Continued)

FOREIGN PATENT DOCUMENTS

| GB | 2490983 A * | 11/2012 | ........... A47B 88/493 |
| JP | 3174027 U | 3/2012 | |

*Primary Examiner* — Hiwot E Tefera
*Assistant Examiner* — Ryan A Doyle
(74) *Attorney, Agent, or Firm* — Winston Hsu

(57) ABSTRACT

A slide rail assembly includes a first rail, a second rail, a third rail, a synchronization member and a fastening member. The third rail is movably mounted between the first and second rails. The synchronization member and the fastening member are movably mounted to the third rail. The synchronization member is configured to engage with the second rail, such that the second and third rails can be synchronously moved relative to the first rail along an opening direction. When the second and third rails are moved to a first predetermined position, the synchronization member is disengaged from the second rail. When the third rail is moved from the first predetermined position to a second predetermined position along the opening direction, the third rail is fastened to the first rail by the fastening member to prevent the third rail from being moved relative to the first rail along a retracted direction.

20 Claims, 16 Drawing Sheets

(51) Int. Cl.
*A47B 88/49* (2017.01)
*A47B 88/447* (2017.01)
*A47B 88/493* (2017.01)
*A47B 88/53* (2017.01)
*A47B 88/473* (2017.01)
*F16C 29/12* (2006.01)
*A47B 88/50* (2017.01)

(52) U.S. Cl.
CPC ............. *A47B 88/49* (2017.01); *F16C 29/12* (2013.01); *A47B 88/473* (2017.01); *A47B 88/493* (2017.01); *A47B 88/50* (2017.01); *A47B 88/53* (2017.01); *A47B 2210/007* (2013.01); *F16C 2314/72* (2013.01)

(58) Field of Classification Search
CPC ....... A47B 88/493; A47B 88/50; A47B 88/53; A47B 2210/007; F16C 29/12; F16C 2314/72
See application file for complete search history.

(56) References Cited

U.S. PATENT DOCUMENTS

| | | | |
|---|---|---|---|
| 6,997,529 B1 | 2/2006 | Chen | |
| 7,357,468 B2 | 4/2008 | Hwang | |
| 7,918,517 B2 | 4/2011 | Chen | |
| 8,152,251 B2 | 4/2012 | Huang | |
| 9,538,845 B1 | 1/2017 | Chen | |
| 10,342,341 B2* | 7/2019 | Chen | A47B 88/57 |
| 2004/0174100 A1* | 9/2004 | Chen | A47B 88/50 312/333 |
| 2004/0174104 A1* | 9/2004 | Chen | A47B 88/467 312/334.47 |
| 2004/0222723 A1 | 11/2004 | Fitz | |
| 2005/0162052 A1 | 7/2005 | Chen | |
| 2007/0080616 A1* | 4/2007 | Lam | A47B 88/49 312/334.6 |
| 2007/0164644 A1 | 7/2007 | Hwang | |
| 2008/0197758 A1 | 8/2008 | Mushan | |
| 2008/0231153 A1* | 9/2008 | Cho | A47B 88/53 312/333 |

* cited by examiner

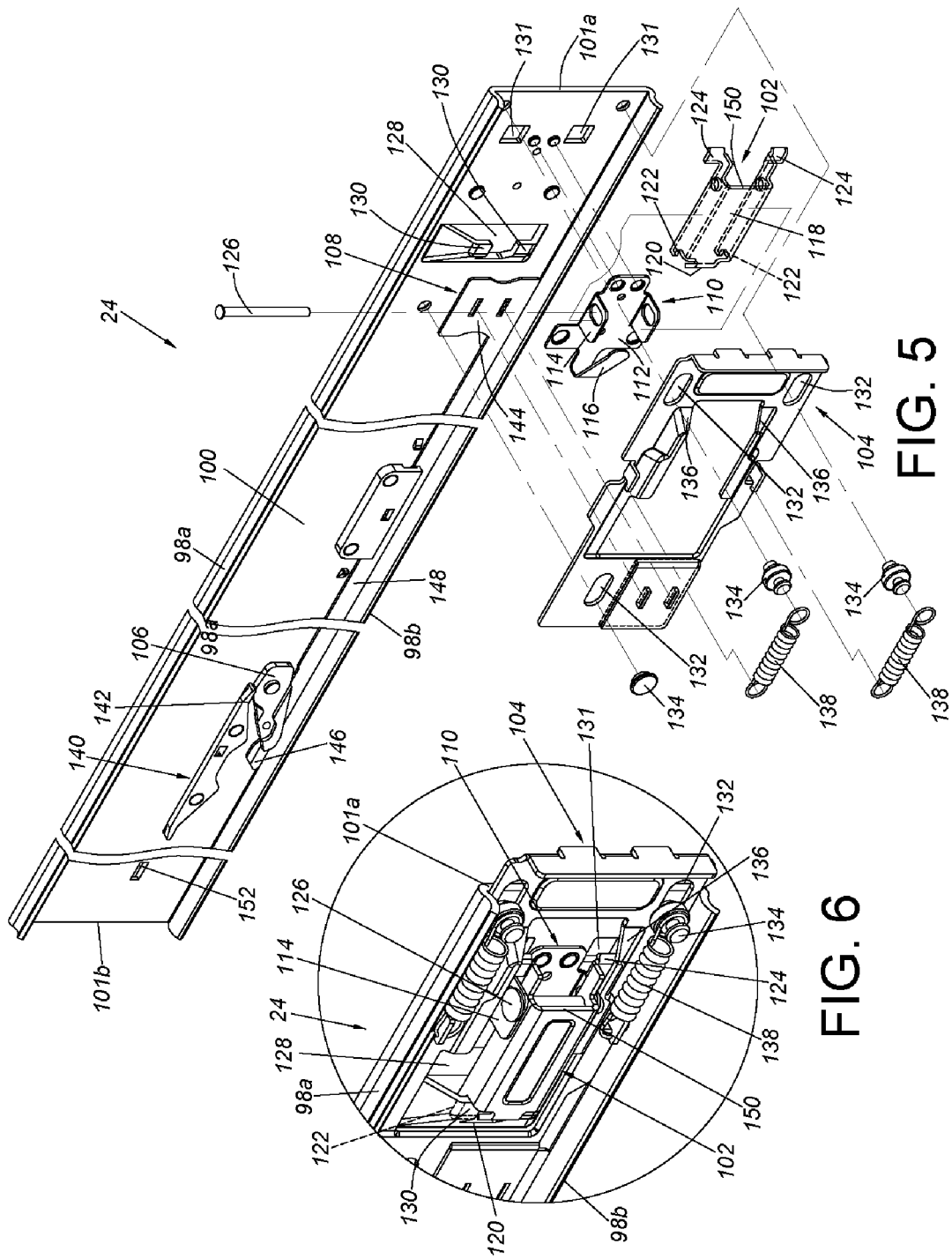

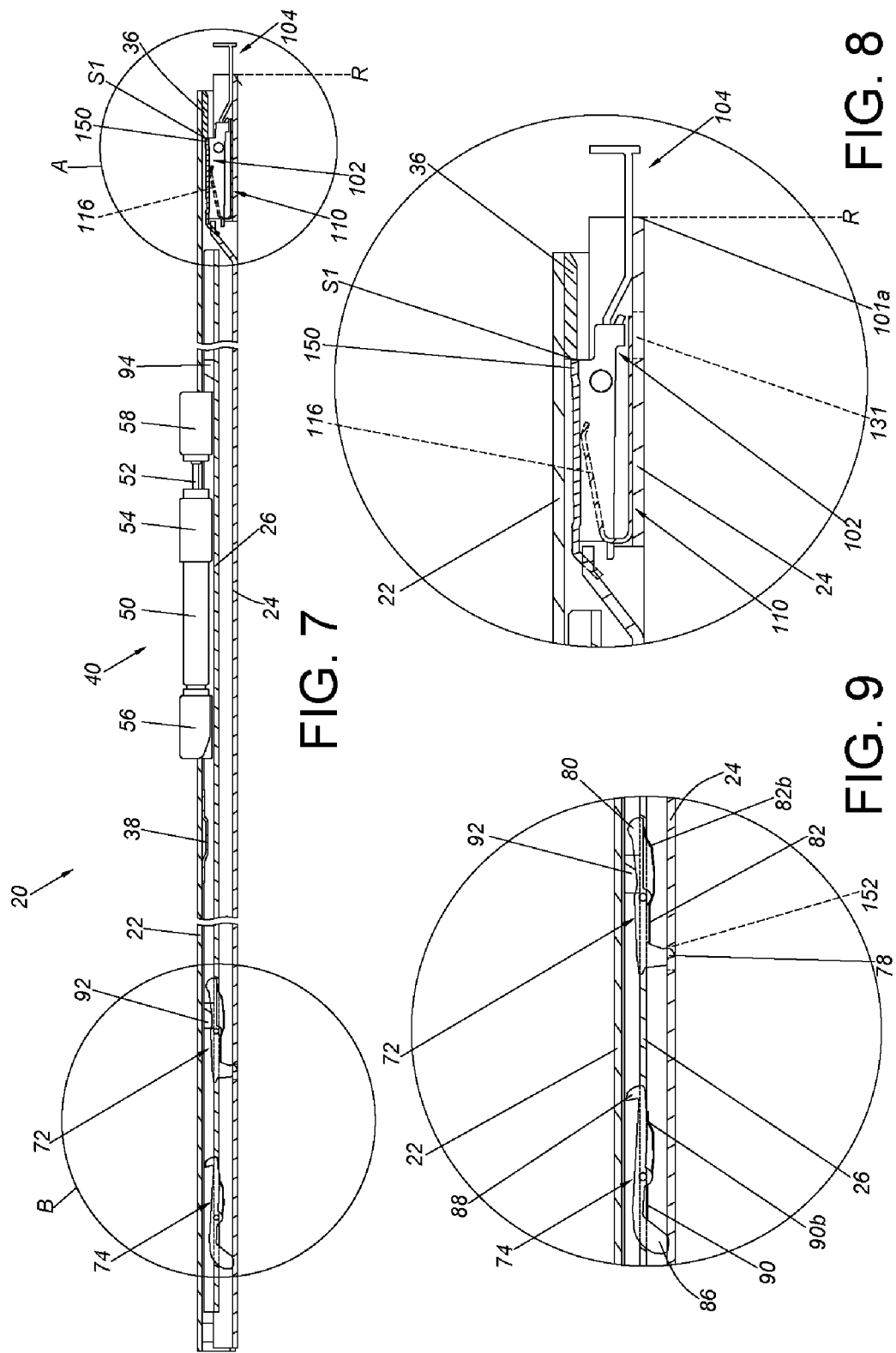

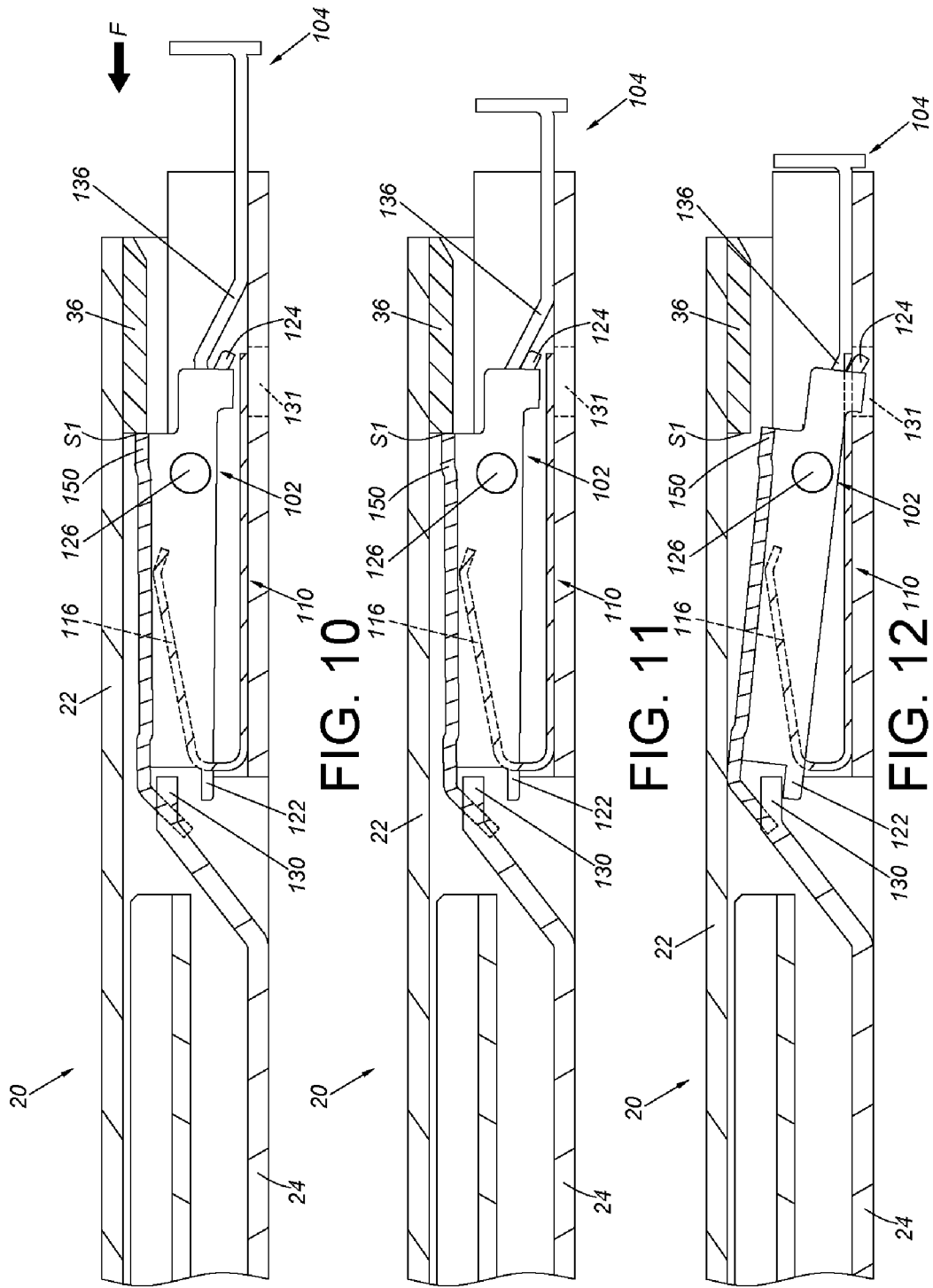

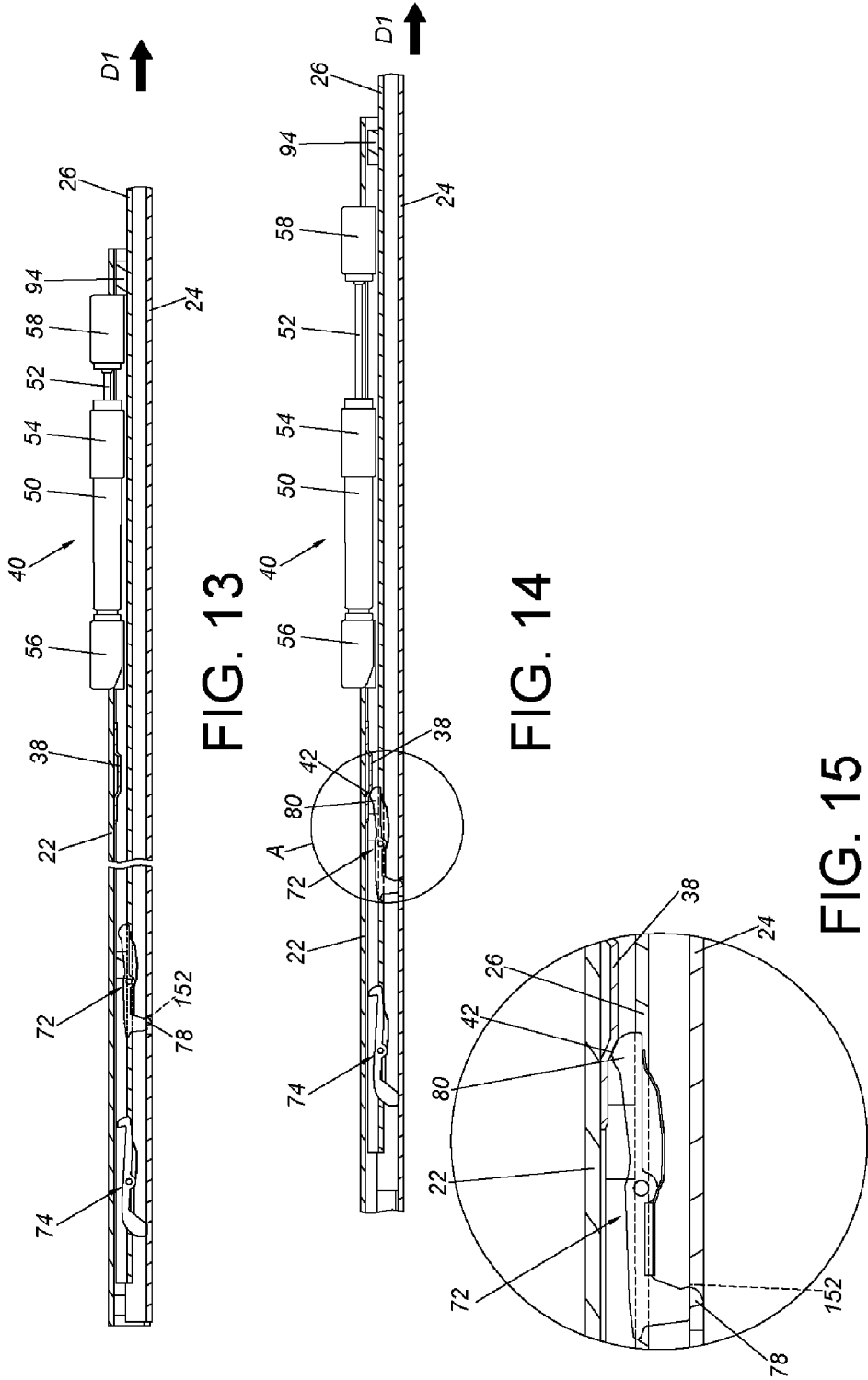

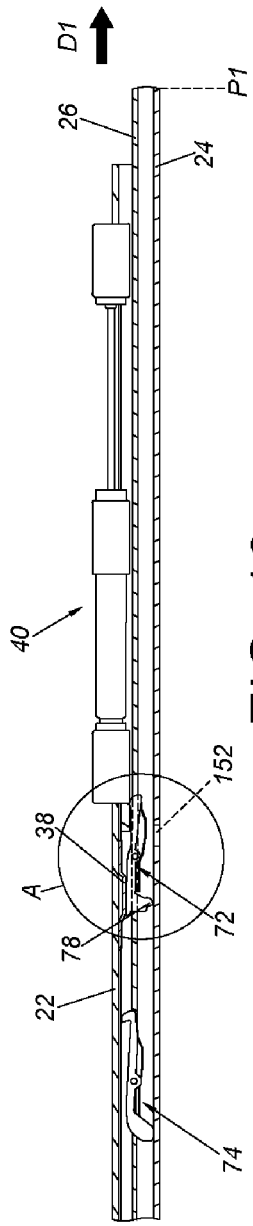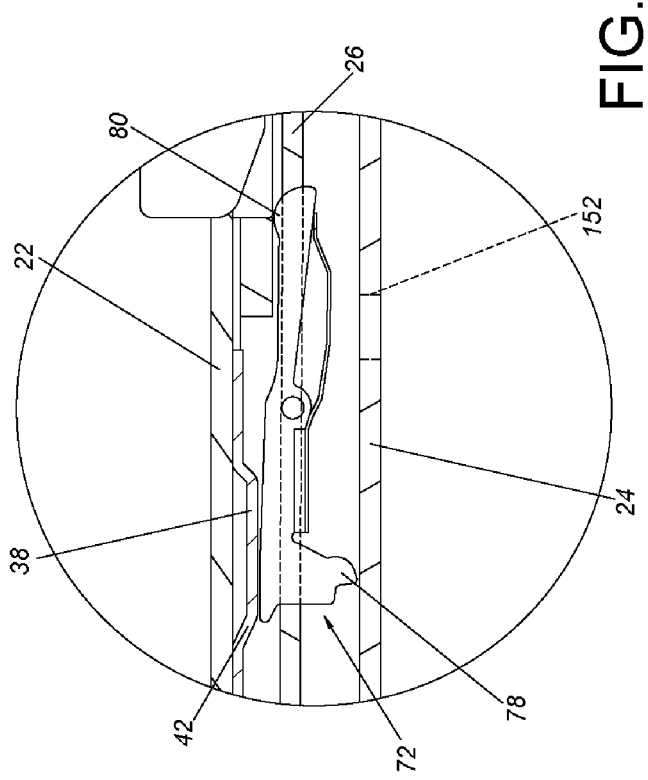

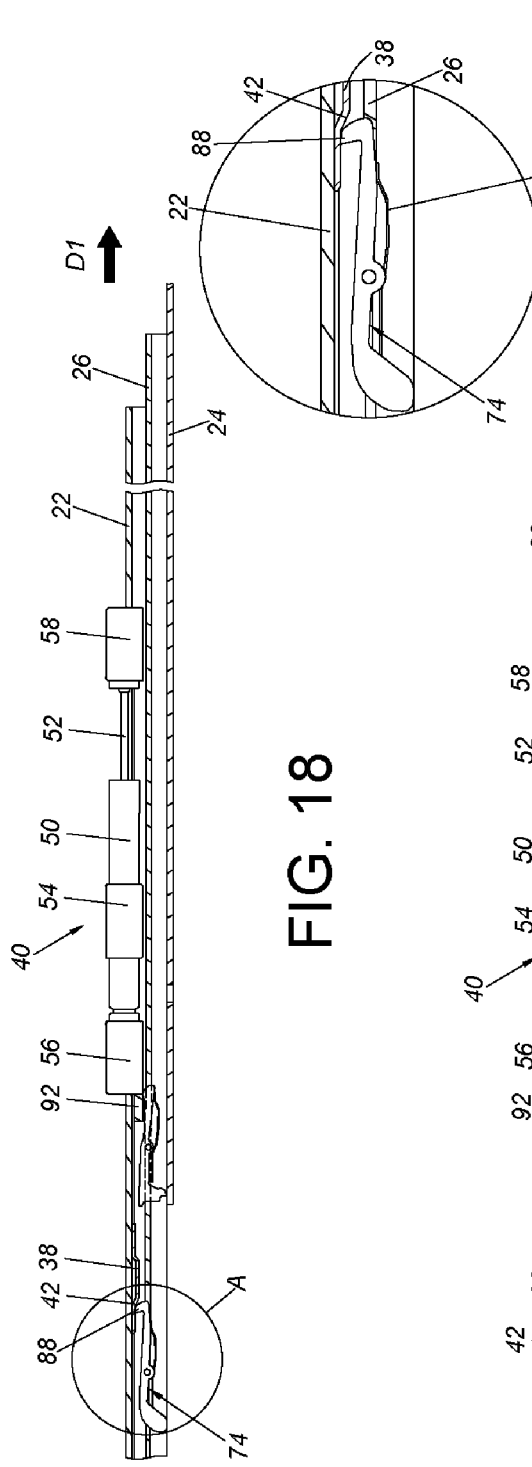
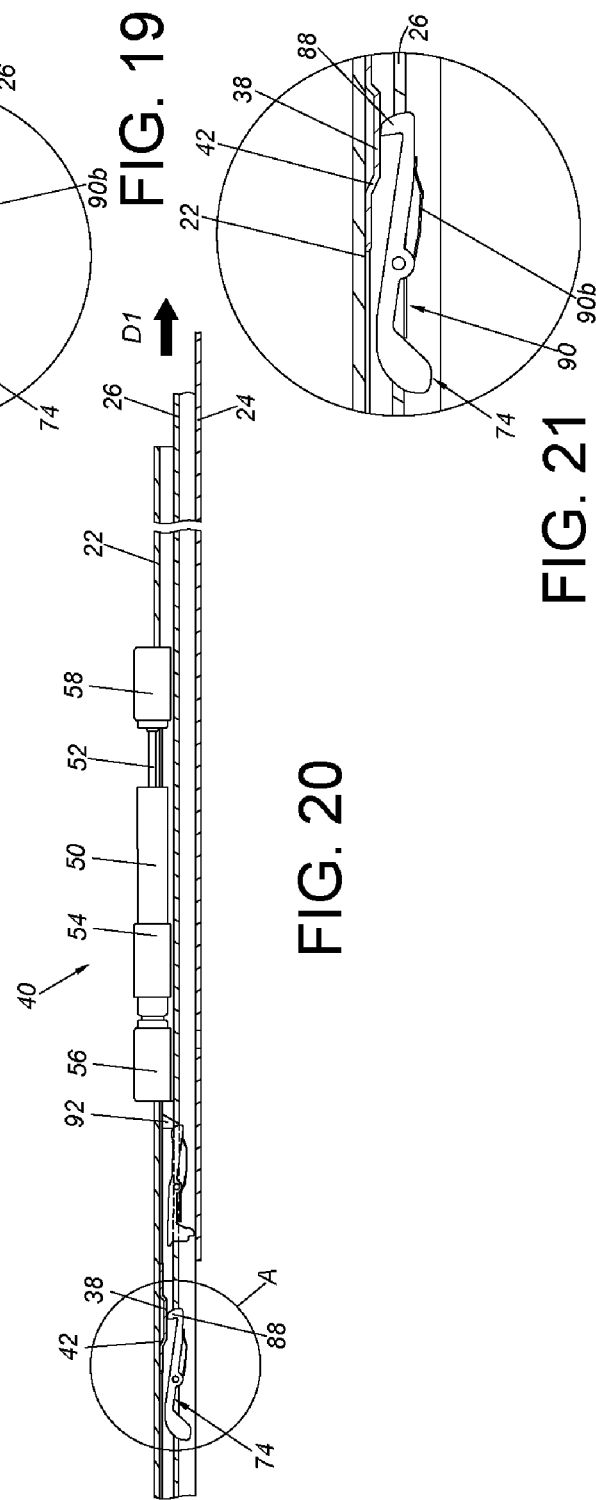

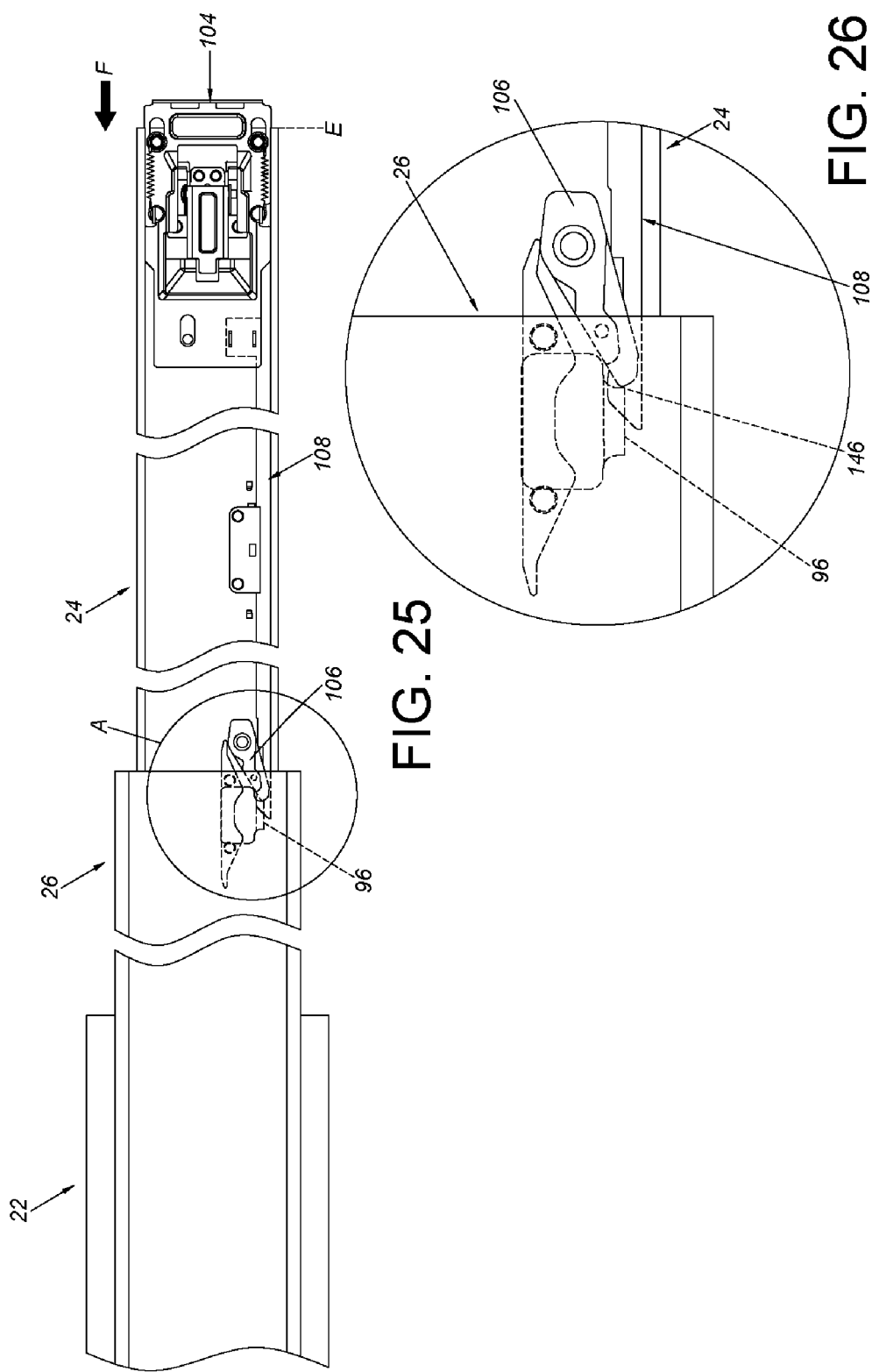

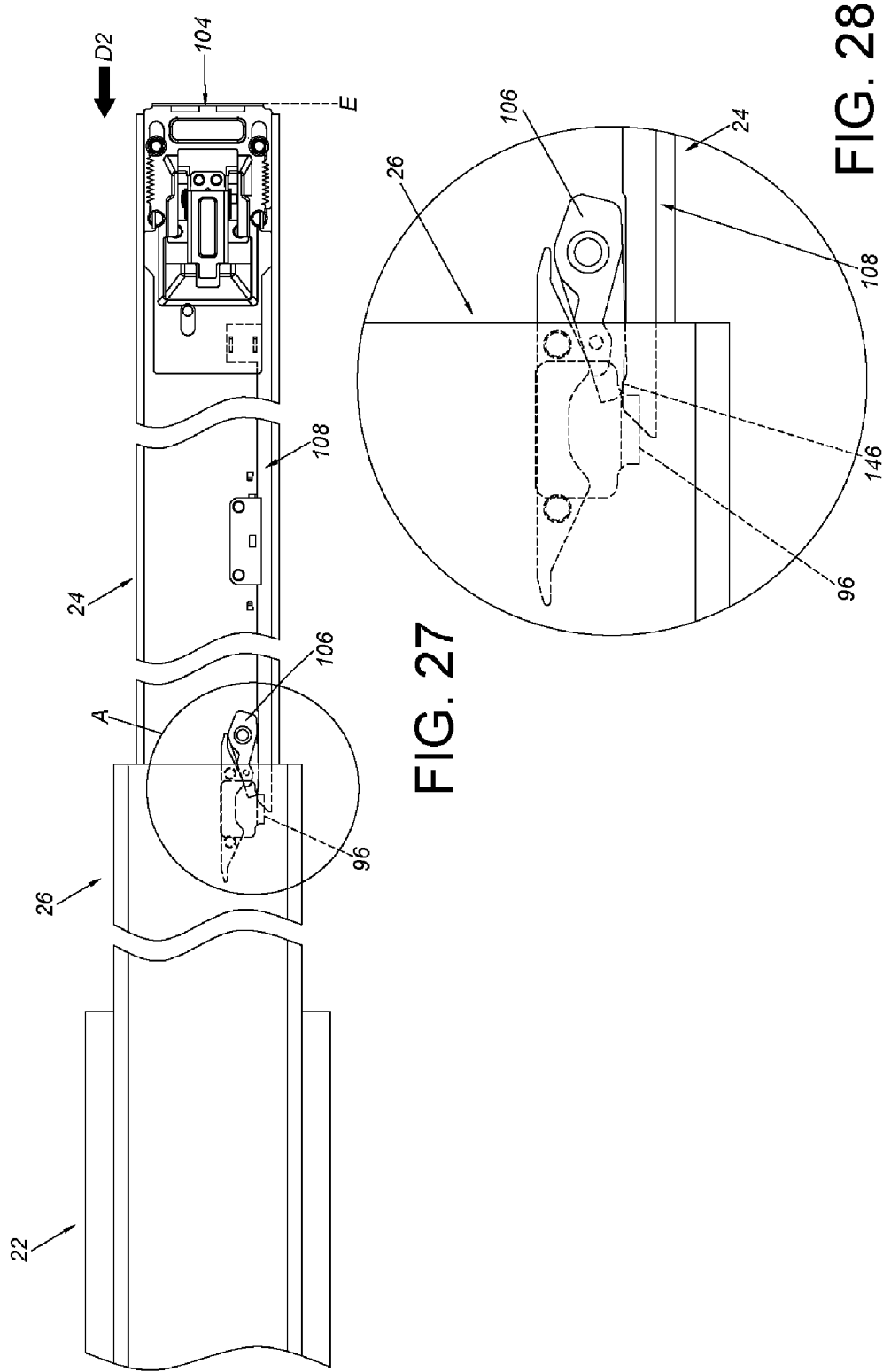

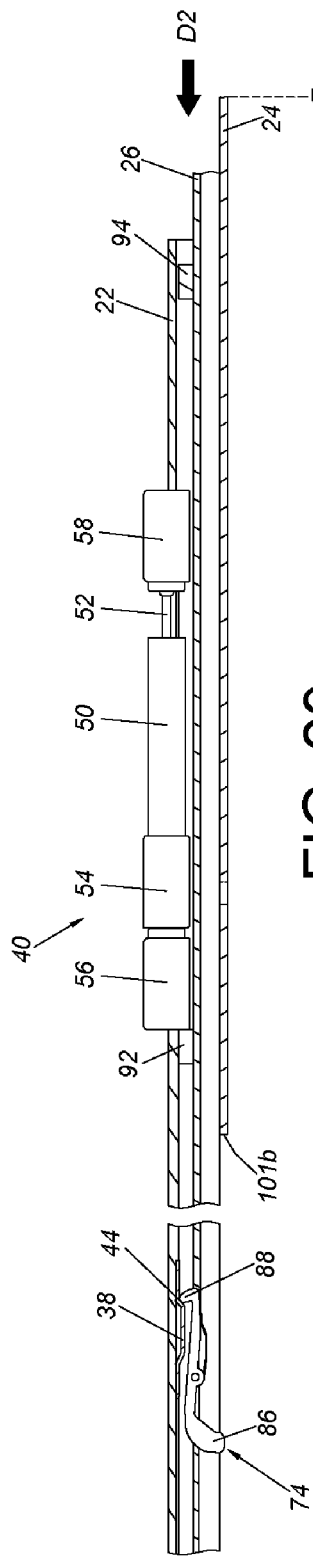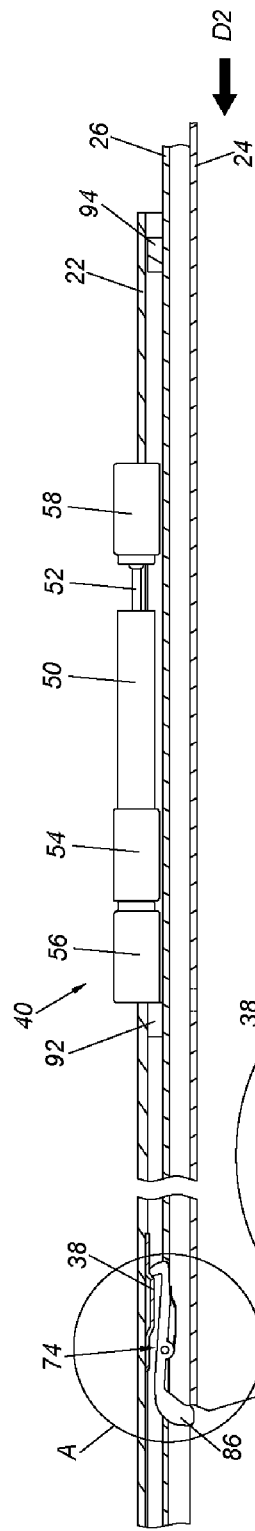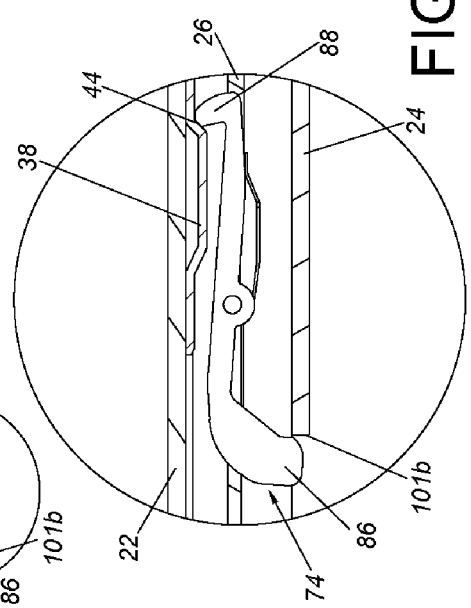

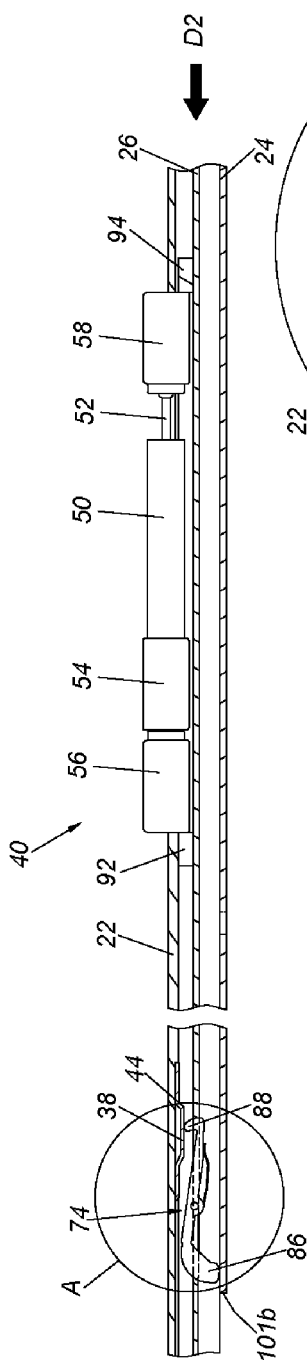
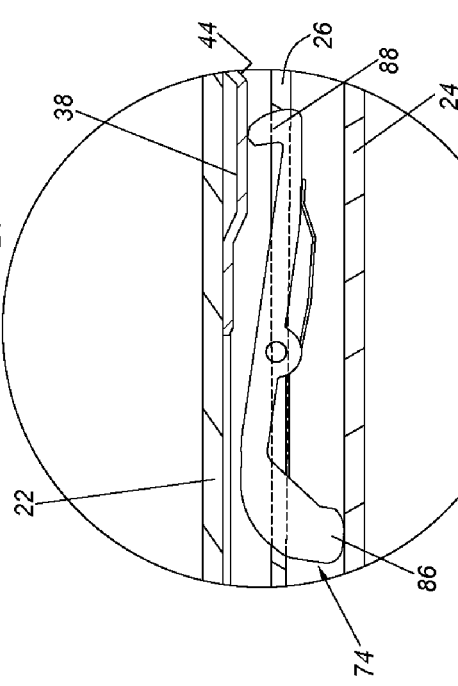
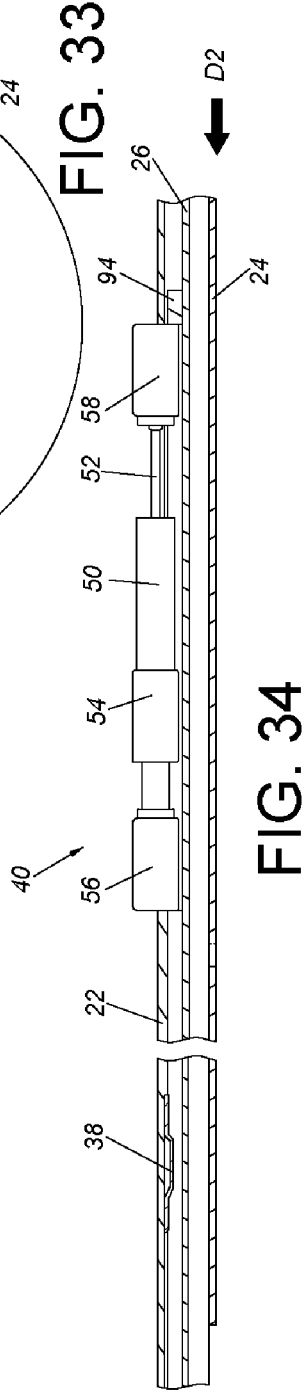
FIG. 32
FIG. 33
FIG. 34

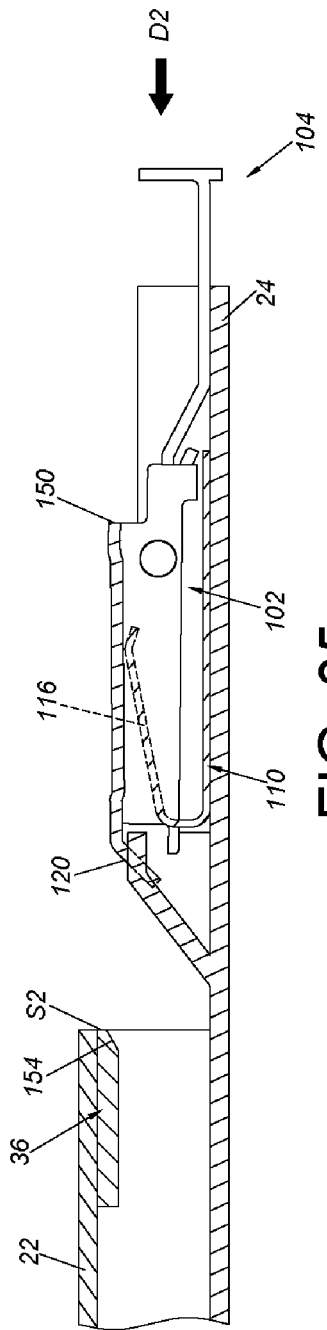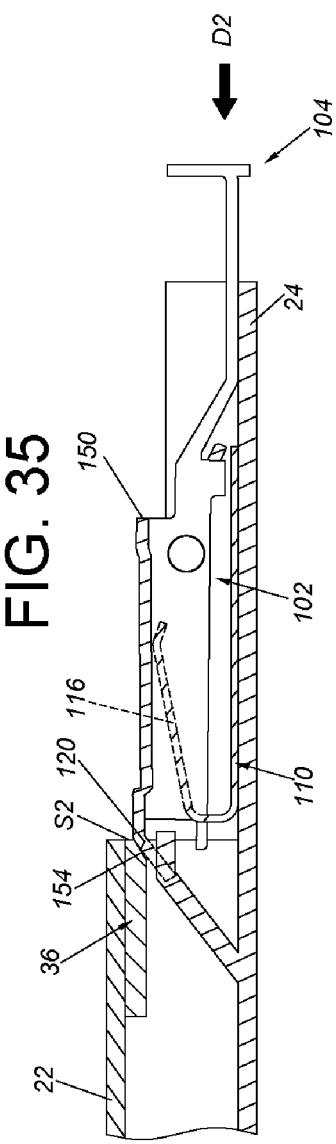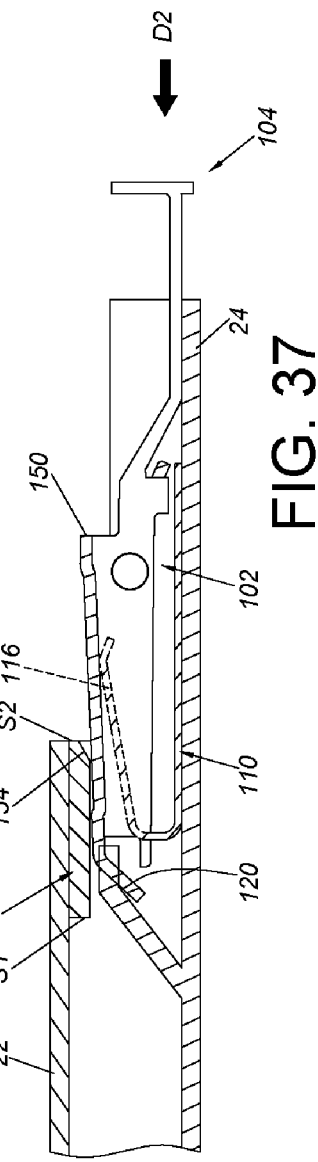

SLIDE RAIL ASSEMBLY

BACKGROUND OF THE INVENTION

1. Field of the Invention

The present invention relates to a slide rail assembly, and more particularly, to a slide rail assembly having two rails capable of moving synchronously.

2. Description of the Prior Art

Generally, a slide rail assembly comprises a first rail and a second rail movable relative to the first rail. Preferably, the slide rail assembly further comprises a third rail movably mounted between the first rail and the second rail for forming a so-called three-section slide rail assembly.

U.S. Pat. No. 7,357,468 B2 discloses a locating structure for a slide assembly, which comprises an outer rail (6), a middle rail (4) and an inner rail (5). Wherein, a linking member (1) and a locating member (2) are pivotally connected to the middle rail (4) by a pivoting pin (13), and an elastic member (3) is fixed to the middle rail (4) for providing an elastic force to the linking member (1) and the locating member (2). The middle rail (4) and the inner rail (5) can be synchronously pulled out. When the middle rail (4) and the inner rail (5) are moved a predetermined distance, the middle rail (4) can be hooked to a retaining portion (611) of the outer rail (6) to be temporarily held at a position. The case is provided for reference.

However, for different market requirements, it is important to develop various products to mount the linking member (1) and the locating member (2) in different ways.

SUMMARY OF THE INVENTION

The present invention relates to a slide rail assembly, and more particularly, to a slide rail assembly having two rails capable of moving synchronously.

According to an embodiment of the present invention, a slide rail assembly comprises a first rail, a second rail, a third rail, a contact member, a synchronization member and a fastening member. The second rail is movable relative to the first rail. The third rail is movably mounted between the first rail and the second rail. The contact member is mounted to the first rail. The synchronization member is movably mounted to the third rail by a first shaft member. The fastening member is movably mounted to the third rail by a second shaft member. Wherein, when the second rail is moved from a retracted position along an opening direction, the third rail is synchronously moved with the second rail relative to the first rail along the opening direction through the synchronization member; when the second rail and the third rail are moved to a first predetermined position, the third rail is no longer synchronously moved with the second rail due to interaction between the synchronization member and the contact member. Wherein, when the third rail is moved from the first predetermined position to a second predetermined position along the opening direction, the fastening member is configured to be fastened to the contact member, in order to prevent the third rail from being retracted relative to the first rail along a retracted direction.

Preferably, the synchronization member is pivoted to the third rail by the first shaft member. The synchronization member has a first part and a second part respectively located at two sides of the first shaft member. The first part is configured to engage with the second rail. When the second rail and the third rail are moved to the first predetermined position, the second part contacts the contact member to deflect the synchronization member in order to disengage the first part from the second rail.

Preferably, the slide rail assembly further comprises a first elastic member configured to apply an elastic force to the synchronization member.

Preferably, the fastening member is pivoted to the third rail by the second shaft member. The fastening member has a first section and a second section respectively located at two sides of the second shaft member. The second section is configured to be fastened to the contact member.

Preferably, the slide rail assembly further comprises a second elastic member configured to apply an elastic force to the fastening member.

Preferably, the slide rail assembly further comprises a damping device mounted to the first rail. The third rail comprises a first pushing feature and a second pushing feature respectively located at two sides of the damping device. The first pushing feature and the second pushing feature of the third rail are configured to push the damping device along the opening direction and the retracted direction respectively, in order to allow the damping device to provide damping effect.

Preferably, the third rail comprises a blocking feature. The slide rail assembly further comprises a working member movably mounted to the second rail. When the third rail is located at the second predetermined position and the second rail is located at an open position relative to the third rail, the working member is blocked by the blocking feature in order to prevent the second rail from being moved from the open position along the retracted direction.

Preferably, the working member is pivoted to the second rail. The slide rail assembly further comprises a base and a releasing member. The base has an elastic part for providing an elastic force to the working member. The releasing member is operatively connected to the working member and configured to deflect the working member to be no longer blocked by the blocking feature.

Preferably, when the working member is operated to be no longer blocked by the blocking feature, and the second rail is moved relative to the third rail from the open position along the retracted direction, the second rail is configured to disengage the fastening member from the contact member, for allowing the third rail to be moved relative to the first rail along the retracted direction.

Preferably, the slide rail assembly further comprises a blocking structure and a locking member. The blocking structure is mounted to the first rail. The locking member is configured to abut against the blocking structure, in order to prevent the second rail from being moved relative to the first rail from the retracted position along the opening direction.

Preferably, the slide rail assembly further comprises an operating member configured to be operated to disengage the locking member from the blocking structure, for allowing the second rail to be moved relative to the first rail along the opening direction.

Preferably, the slide rail assembly further comprises a supporting structure having an elastic part for providing an elastic force to the locking member. When the second rail is located at the retracted position, the locking member is held to abut against the blocking structure in response to the elastic force of the elastic part.

Preferably, the locking member comprises a first feature. The operating member is movable relative to the second rail and comprises a second feature. The operating member is configured to drive the locking member to move through interaction between the first feature and the second feature, in order to disengage the locking member from the blocking structure.

Preferably, at least one of the blocking structure and the locking member comprises a guiding feature to assist the locking member in crossing the blocking structure when the second rail is retracted relative to the first rail.

According to another embodiment of the present invention, a slide rail assembly comprises a first rail, a second rail, a third rail, a synchronization member and a fastening member. The second rail is movable relative to the first rail. The third rail is movably mounted between the first rail and the second rail. The synchronization member is pivoted to the third rail by a first shaft member. The fastening member is pivoted to the third rail by a second shaft member. Wherein, the synchronization member is configured to engage with the second rail to allow the third rail to be synchronously moved with the second rail relative to the first rail along a first direction; when the second rail and the third rail are moved to a first predetermined position, the third rail is no longer synchronously moved with the second rail due to interaction between the synchronization member and the first rail. Wherein, when the third rail is moved from the first predetermined position to a second predetermined position along the first direction, the fastening member is configured to be fastened to the first rail, in order to prevent the third rail from being moved relative to the first rail along a second direction.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is an exploded view of the second rail of the slide rail assembly according to an embodiment of the present invention.

FIG. 6 is a diagram showing a portion of the second rail according to an embodiment of the present invention.

FIG. 7 is a diagram showing the slide rail assembly being in a retracted state according to an embodiment of the present invention.

FIG. 8 is an enlarged view of an area A of FIG. 7.

FIG. 9 is an enlarged view of an area B of FIG. 7.

FIG. 10 is a diagram showing a locking member of the slide rail assembly configured to abut against a blocking structure according to an embodiment of the present invention.

FIG. 11 is a diagram showing an operating member of the slide rail assembly being operated to contact the locking member according to an embodiment of the present invention.

FIG. 12 is a diagram showing the locking member of the slide rail assembly being disengaged from the blocking structure according to an embodiment of the present invention.

FIG. 13 is a diagram showing the second rail and the third rail of the slide rail assembly being synchronously moved relative to the first rail along a first direction according to an embodiment of the present invention.

FIG. 14 is a diagram showing the second rail and the third rail of the slide rail assembly being further synchronously moved relative to the first rail along the first direction according to an embodiment of the present invention.

FIG. 15 is an enlarged view of an area A of FIG. 14.

FIG. 16 is a diagram showing the second rail and the third rail of the slide rail assembly being no longer synchronously moved relative to the first rail according to an embodiment of the present invention.

FIG. 17 is an enlarged view of an area A of FIG. 16.

FIG. 18 is a diagram showing the second rail and the third rail of the slide rail assembly being moved relative to the first rail along the first direction, and a damping device providing a damping effect according to an embodiment of the present invention.

FIG. 19 is an enlarged view of an area A of FIG. 18.

FIG. 20 is a diagram showing the second rail and the third rail of the slide rail assembly being further moved relative to the first rail along the first direction according to an embodiment of the present invention.

FIG. 21 is an enlarged view of an area A of FIG. 20.

FIG. 25 is a diagram showing the slide rail assembly being in an open state according to an embodiment of the present invention.

FIG. 26 is an enlarged view of an area A of FIG. 25.

FIG. 27 is a diagram showing the slide rail assembly being in the open state, and a working member being driven to be no longer blocked by a blocking feature by the operating member.

FIG. 28 is an enlarged view of an area A of FIG. 27.

FIG. 29 is a diagram showing the second rail of the slide rail assembly being moved relative to the first rail and the third rail along a second direction according to an embodiment of the present invention.

FIG. 30 is a diagram showing the second rail of the slide rail assembly being further moved relative to the first rail and the third rail along the second direction, and the second rail contacting the fastening member according to an embodiment of the present invention.

FIG. 31 is an enlarged view of an area A of FIG. 30.

FIG. 32 is a diagram showing the second rail and the third rail of the slide rail assembly being moved relative to the first rail along the second direction, and the fastening member being deflected according to an embodiment of the present invention.

FIG. 33 is an enlarged view of an area A of FIG. 32.

FIG. 34 is a diagram showing the second rail and the third rail of the slide rail assembly being further moved relative to the first rail along the second direction, and the damping device providing a damping effect according to an embodiment of the present invention.

FIG. 35 is a diagram showing the second rail of the slide rail assembly being moved relative to the first rail along the second direction according to an embodiment of the present invention.

FIG. 36 is a diagram showing the second rail of the slide rail assembly being further moved relative to the first rail along the second direction, and the locking member contacting the blocking structure according to an embodiment of the present invention.

FIG. 37 is a diagram showing the second rail of the slide rail assembly being further moved relative to the first rail along the second direction, and the locking member crossing the blocking structure according to an embodiment of the present invention.

DETAILED DESCRIPTION

Figure 1:
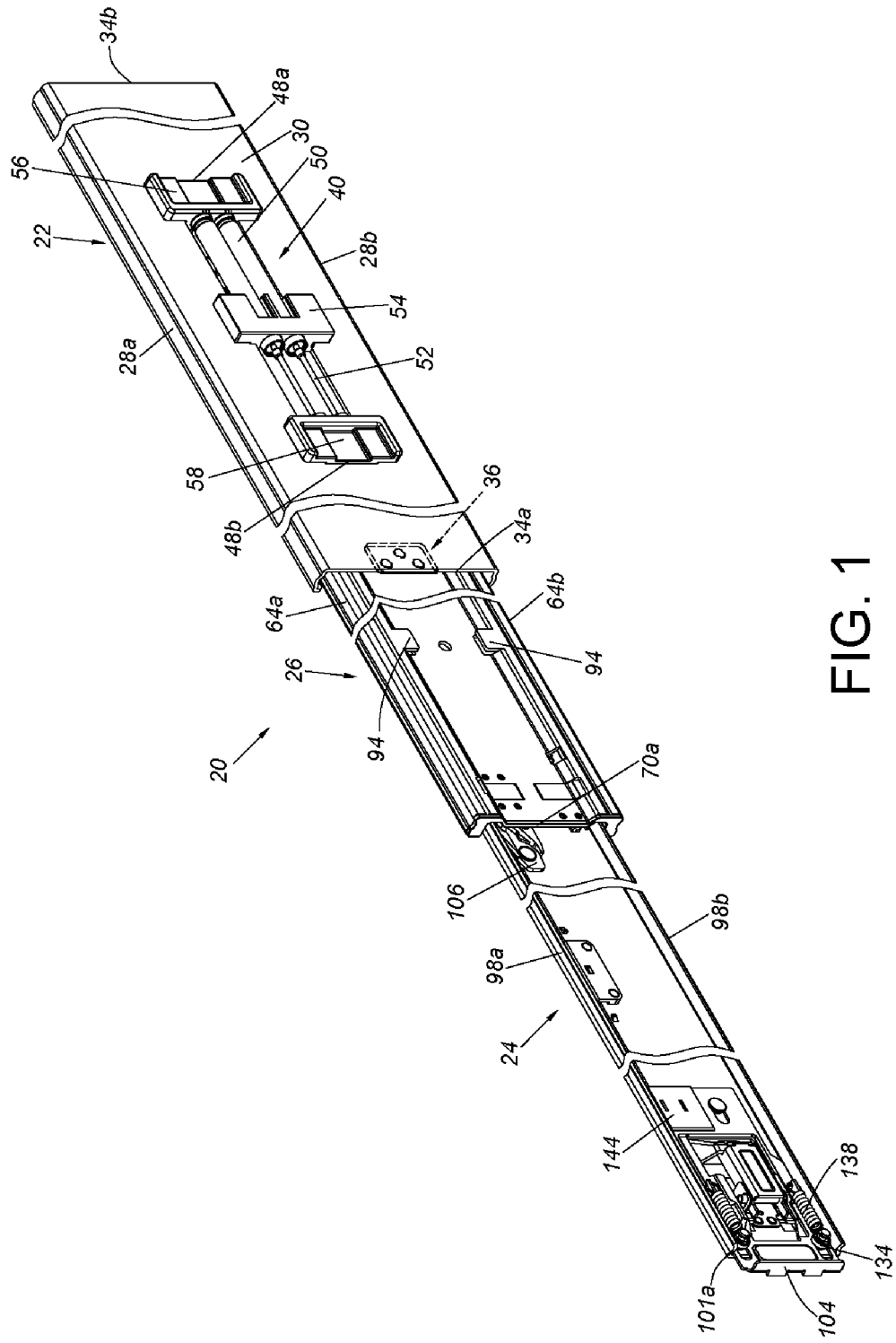
FIG. 1 is a diagram showing a slide rail assembly comprising a first rail, a second rail and a third rail according to an embodiment of the present invention.
Figure 2:
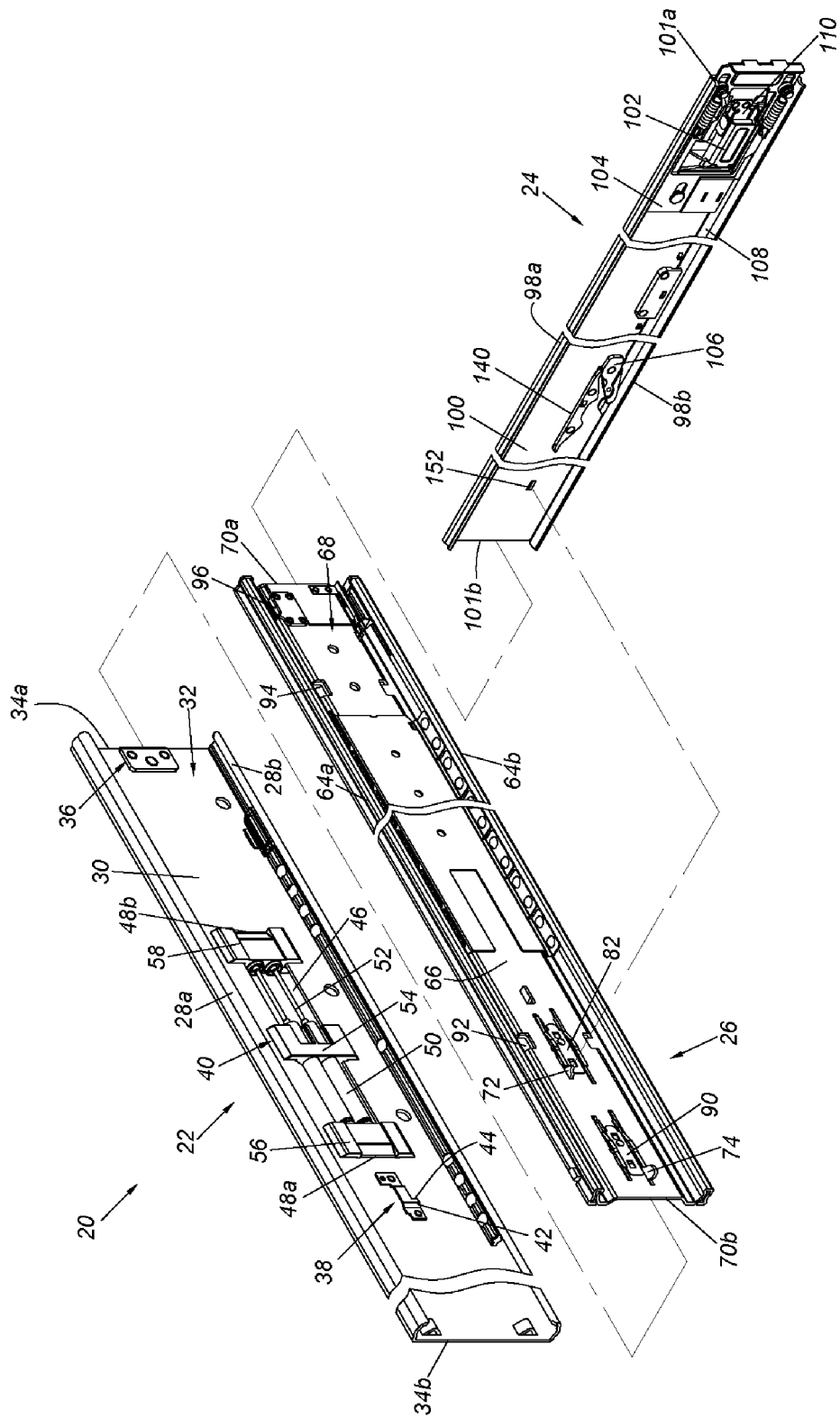
FIG. 2 is an exploded view of the slide rail assembly according to an embodiment of the present invention.

As shown in FIG. 1 and FIG. 2, a slide rail assembly 20 comprises a first rail 22 and a second rail 24 according to an embodiment of the present invention. Preferably, the slide rail assembly 20 further comprises a third rail 26 movably mounted between the first rail 22 and the second rail 24 for extending a traveling distance of the second rail 24 relative to the first rail 22.

Figure 3:
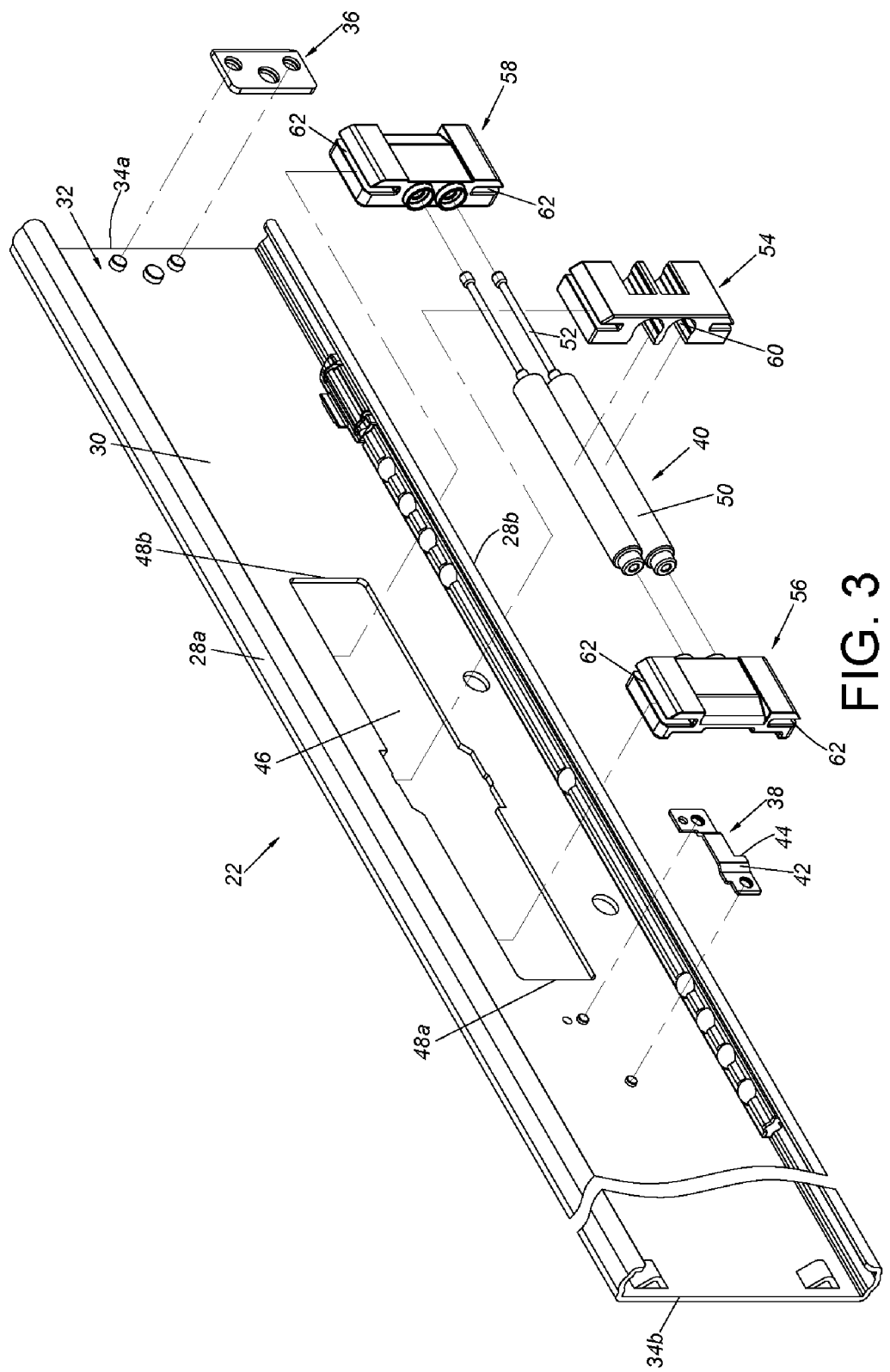
FIG. 3 is an exploded view of the first rail of the slide rail assembly according to an embodiment of the present invention.

As shown in FIG. 2 and FIG. 3, the first rail 22 comprises a first wall 28a, a second wall 28b and a side wall 30 connected between the first wall 28a and the second wall 28b. A first passage 32 is defined by the first wall 28a, the second wall 28b and the side wall 30 of the first rail 22. The first rail 22 has a front part 34a and a rear part 34b.

The slide rail assembly 20 further comprises a blocking structure 36, a contact member 38 and at least one damping device 40.

The blocking structure 36 is mounted to the side wall 30 of the first rail 22. Wherein, the blocking structure 36 can be fixed to the first rail 22 by riveting, screwing or welding; or, the blocking structure 36 can be integrally formed on the first rail 22. Therefore, the blocking structure 36 can be seen as a portion of the first rail 22. In the present embodiment, the blocking structure is a protruded wall, but the present invention is not limited thereto. In another embodiment, the blocking structure 36 can be a recessed structure (or a hole). Preferably, the blocking structure 36 is adjacent to the front part 34a of the first rail 22.

The contact member 38 is mounted to the side wall 30 of the first rail 22. The contact member 38 can be fixed to the first rail 22 by riveting, screwing or welding; or, the contact member 38 can be integrally formed on the first rail 22. Therefore, the contact member 38 can be seen as a portion of the first rail 22. Preferably, the contact member 38 is away from the front part 34a of the first rail 22. That is, the contact member 38 and the blocking structure 36 are located at different positions on the first rail 22. The contact member 38 comprises a guiding part 42 and an abutting part 44 adjacent to the guiding part 42. Wherein, the guiding part 42 has an inclined surface or an arc surface.

The at least one damping device 40 is mounted to the first rail 22. In the present embodiment, there are two damping devices 40 mounted to the first rail 22. Preferably, each of the damping devices 40 is located between the blocking structure 36 and the contact member 38. Specifically, the side wall 30 of the first rail 22 has an opening 46. Two opposite sides of the opening 46 are provided with a first side wall 48a and a second side wall 48b respectively. On the other hand, the damping device 40 is configured to provide a damping effect. The damping device 40 comprises a first damping part 50 and a second damping part 52. For example, the first damping part 50 can be a cylinder, and the second damping part 52 can be a rod. Wherein, the cylinder contains a damping medium and/or an elastic object therein, and the rod is configured to be extended from or retracted into the cylinder. Such arrangement is well known to those skilled in the art. For simplification, no further illustration is provided. In another embodiment, the first damping part 50 can be a rod, and the second damping part 52 can be a cylinder, but the present invention is not limited to the aforementioned embodiments. Preferably, the slide rail assembly 20 further comprises a holding base 54, a first component 56 and a second component 58. Specifically, the holding base 54 is located within the opening 46 between the first side wall 48a and the second side wall 48b. Preferably, the holding base 54 is mounted to the first rail 22. For example, the holding base 54 can be fixed to the first rail 22 by engaging, riveting or screwing. In addition, the holding base 54 provides mounting structures 60 for mounting the damping device 40. On the other hand, the first component 56 and the second component 58 are movably mounted to the first rail 22. For example, each of the first component 56 and the second component 58 has at least one sliding feature 62. The at least one sliding feature 62 can be a sliding groove slidable within the opening 46 of the first rail 22, so as to allow the first component 56 and the second component 58 to move relative to the first rail 22. Furthermore, the first component 56 is located between the first side wall 48a and the first damping part 50, and the second component 58 is located between the second side wall 48b and the second damping part 52.

Figure 4:
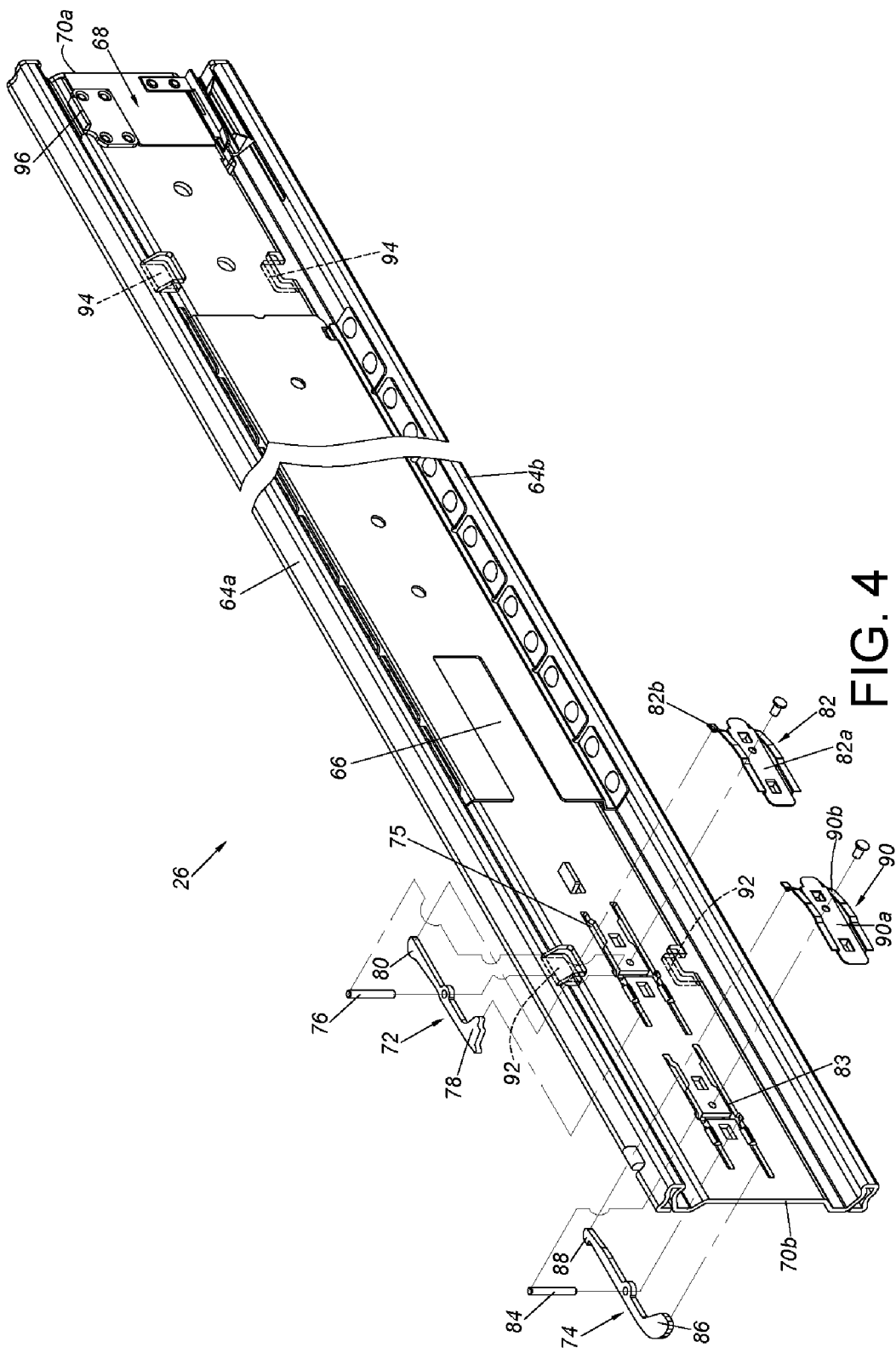
FIG. 4 is an exploded view of the third rail of the slide rail assembly according to an embodiment of the present invention.

As shown in FIG. 2 and FIG. 4, the third rail 26 is mounted to the first passage 32 of the first rail 22 and movable relative to the first rail 22. Specifically, the third rail 26 comprises a first wall 64a, a second wall 64b and a side wall 66 connected between the first wall 64a and a second wall 64b. A second passage 68 is defined by the first wall 64a, the second wall 64b and the side wall 66. The third rail 26 has a front part 70a and a rear part 70b.

The slide rail assembly 20 further comprises a synchronization member 72 and a fastening member 74. The synchronization member 72 is movably mounted to one of the third rail 26 and the second rail 24. In the present embodiment, the synchronization member 72 is movably mounted to the third rail 26. Preferably, the third rail 26 has a first elongated hole 75. The synchronization member 72 is pivoted to the third rail 26 by a first shaft member 76. The synchronization member 72 is configured to be deflected between the first rail 22 and the second rail 24 through the first elongated hole 75. The synchronization member 72 has a first part 78 and a second part 80 respectively located at two sides of the first shaft member 76. Preferably, the slide rail assembly 20 further comprises a first elastic member 82 configured to apply an elastic force to the synchronization member 72. For example, the first elastic member 82 has a main body part 82a and an elastic leg 82b connected to the main body part 82a, and the elastic leg 82b is configured to apply an elastic force to the second part 80. On the other hand, the fastening member 74 is movably mounted to the third rail 26. Preferably, the third rail 26 has a second elongated hole 83. The fastening member 74 is pivoted to the third rail 26 by a second shaft member 84. The fastening member 74 is configured to be deflected between the first rail 22 and the second rail 24 through the second elongated hole 83. The fastening member 74 has a first section 86 and a second section 88 respectively located at two sides of the second shaft member 84. Preferably, the slide rail assembly 20 further comprises a second elastic member 90 configured to apply an elastic force to the fastening member 74. For example, the second elastic member 90 has a main body part 90a and an elastic leg 90b connected to the main body part 90a, and the elastic leg 90b is configured to apply an elastic force to the second section 88. The synchronization member 72 and the fastening member 74 are adjacent to the rear part 70b of the third rail 26 and arranged at different positions on the third rail 26 along a longitudinal direction of the third rail 26.

Preferably, the third rail 26 comprises a first pushing feature 92, a second pushing feature 94 and a blocking feature 96. Wherein, a predetermined distance is defined between the first pushing feature 92 and the second pushing feature 94, and both of the first pushing feature 92 and the second pushing feature 94 are protruded structures in the present embodiment. The first pushing feature 92 and the second pushing feature 94 are configured to face toward the side wall 30 of the first rail 22. On the other hand, the blocking feature 96 is configured to face toward a side wall 100 of the second rail 24. The blocking feature 96 can be a protrusion. In the present embodiment, an additional component is fixed to the third rail 26, and the component has the blocking feature 96 adjacent to the front part 70a of the third rail 26. The blocking feature 96 can be seen as a portion of the third rail 26, but the present invention is not limited thereto. In another embodiment, the blocking feature 96 can be integrally formed on the third rail 26.

As shown in FIG. 2, FIG. 5 and FIG. 6, the second rail 24 is mounted to the second passage 68 of the third rail 26 and movable relative to the third rail 26. Specifically, the second rail 24 comprises a first wall 98a, a second wall 98b and the side wall 100 connected between the first wall 98a and the second wall 98b. The second rail 24 has a front part 101a and a rear part 101b. The slide rail assembly 20 further comprises a locking member 102. Preferably, the slide rail assembly 20 further comprises an operating member 104, a working member 106 and a releasing member 108.

When the slide rail assembly 20 is in a retracted state, the locking member 102 is configured to abut against the blocking structure 36 of the first rail 22. Preferably, the locking member 102 can be operatively mounted to the second rail 24, and the locking member 102 is adjacent to the front part 101a of the second rail 24. Specifically, the locking member 102 is movably mounted to the second rail 24. For example, the locking member 102 is pivoted to the second rail 24. In the present embodiment, the slide rail assembly 20 further comprises a supporting structure 110 attached to the second rail 24. The supporting structure 110 comprises a main body part 112, at least one ear part 114 and an elastic part 116. Wherein, the main body part 112 can be connected to the side wall 100 of the second rail 24 by riveting, screwing or welding. The at least one ear part 114 is substantially perpendicularly connected to the main body part 112. The elastic part 116 is tiled relative to the main body part 112 and configured to provide an elastic force to the locking member 102. Furthermore, the locking member 102 comprises a body part 118, a guiding feature 120 and a locking part 150. Wherein, the body part 118 is pivoted to the at least one ear part 114 of the supporting structure 110 by a pin member 126, and the guiding feature 120 and the locking part 150 are respectively located at two sides of the pin member 126. The guiding feature 120 has an inclined surface or an arc surface. Preferably, the guiding feature 120 is configured to face toward the side wall 30 of the first rail 22 through a through hole 128 of the second rail 24. Preferably, the locking member 102 further comprises at least one shoulder part 122 and at least one first feature 124. The at least one shoulder part 122 is extended from the body part 118 and adjacent to the guiding feature 120. Preferably, the at least one shoulder part 122 is located at a position corresponding to at least one limiting part 130 of the second rail 24, wherein the at least one limiting part 130 is protruded relative to the side wall 100 of the second rail 24. On the other hand, the at least one first feature 124 is connected to the body part 118 and adjacent to the locking part 150. The at least one first feature 124 is located at a position corresponding to at least one hole 131 of the second rail 24.

The operating member 104 is configured to be operated to move the locking member 102. Specifically, the operating member 104 is movable relative to the second rail 24. For example, the operating member 104 has at least one elongated hole 132. The operating member 104 is movably mounted to the second rail 24 by arranging at least one connecting member 134 to pass through a portion of the at least one elongated hole 132. Preferably, the operating member 104 comprises at least one second feature 136 configured to interactively work with the at least one first feature 124 of the locking member 102. Wherein, one of the at least one second feature 136 and the at least one first feature 124 has an inclined surface or an arc surface. Preferably, the slide rail assembly 20 further comprises at least one auxiliary elastic member 138 configured to apply an elastic force to the operating member 104, in order to hold the operating member 104 in a predetermined operating state.

The working member 106 is movably mounted to the second rail 24. For example, the working member 106 is pivoted to the side wall 100 of the second rail 24. Preferably, the slide rail assembly 20 further comprises a base 140 having an elastic part 142 for providing an elastic force to the working member 106, in order to hold the working member 106 in a predetermined state relative to the second rail 24.

The releasing member 108 is operatively connected to the working member 106. Preferably, the releasing member 108 comprises a releasing part 144, a driving part 146 and an extension part 148. The releasing part 144 is connected to the operating member 104. The driving part 146 is configured to drive the working member 106 to move. The extension part 148 is connected between the releasing part 144 and the driving part 146, and the extension part 148 is substantially arranged along a longitudinal direction of the second rail 24.

As shown in FIG. 7 and FIG. 8, the slide rail assembly 20 is in a retracted state. Specifically, in the retracted state, the second rail 24 and the third rail 26 are retracted relative to the first rail 22. Wherein, when the second rail 24 is located at a retracted position R (or a predetermined position) relative to the first rail 22, the locking part 150 of the locking member 102 is configured to abut against a first side S1 of the blocking structure 36 of the first rail 22, in order to prevent the second rail 24 from being moved relative to the first rail 22 from the retracted position R along a first direction (such as an opening direction), so as to ensure that the slide rail assembly 20 is in the retracted state. Preferably, the operating member 104 is extended beyond the front part 101a of the second rail 24 for allowing a user to operate the operating member 104 conveniently. Wherein, when the second rail 24 is located at the retracted position R, the locking part 150 of the locking member 102 is held to abut against the blocking structure 36 of the first rail 22 in response to the elastic force of the elastic part 116 of the supporting structure 110. In the present embodiment, the elastic part 116 of the supporting structure 110 is configured to elastically support the locking member 102. In addition, as shown in FIG. 7, the first pushing feature 92 and the second pushing feature 94 of the third rail 26 are respectively located at two sides of the damping device 40. Preferably, since the locking part 150 of the locking member 102 abuts against the first side S1 of the blocking structure 36 of the first rail 22, the second pushing feature 94 can temporarily abut against the second damping part 52 of the damping device 40 through the second component 58, such that the second damping part 52 is retracted relative to the first damping part 50.

More particularly, as shown in FIG. 9, when the slide rail assembly 20 is in the retracted state, the elastic leg 82b of the first elastic member 82 applies an elastic force to the second part 80 of the synchronization member 72, such that the second part 80 of the synchronization member 72 leans toward the first rail 22, and the first part 78 of the synchronization member 72 is engaged with an engaging feature 152 of the second rail 24 (such as engaged with a wall of a hole or groove on the second rail 24); on the other hand, the elastic lag 90b of the second elastic member 90 applies an elastic force to the second section 88 of the fastening member 74, such that the second section 88 of the fastening member 74 leans toward the first rail 22, and the first section 86 of the fastening member 74 leans toward the second rail 24.

As shown in FIG. 10 and FIG. 11, in order to operate the slide rail assembly 20 to be no longer in the retracted state, the user can operate the locking member 102 to move the locking part 150 of the locking member 102 to no longer abut against the first side S1 of the blocking structure 36 of the first rail 22. For example, the user can apply a force F to the operating member 104 to move the operating member 104 relative to the locking member 102, so as to drive the locking member 102 to move.

As shown in FIG. 11 and FIG. 12, when the locking member 102 is operated and driven to move, the locking part 150 of the locking member 102 is disengaged from the blocking structure 36. Preferably, through interaction between the second feature 136 of the operating member 104 and the first feature 124 of the locking member 102 (such as two inclined surfaces or arc surfaces abutting against each other), the operating member 104 can easily drive the locking member 102 to deflect, in order to disengage the locking part 150 of the locking member 102 from the first side S1 of the blocking structure 36. Wherein, when the locking member 102 is operated to deflect, the elastic part 116 of the supporting structure 110 is elastically bent for accumulating an elastic force, and the first feature 124 of the locking member 102 approaches to the hole 131 of the second rail 24. In addition, when the locking member 102 is operated to deflect, the shoulder part 122 of the locking member 102 is configured to abut against the limiting part 130 of the second rail 24.

As shown in FIG. 13, when the locking member 102 is disengaged from the blocking structure 36, the second rail 24 and the third rail 26 are movable relative to the first rail 22 from the retracted position along the first direction D1. Wherein, when the second rail 24 is moved along the first direction D1, the second rail 24 and the third rail 26 can be synchronously moved relative to the first rail 22 along the first direction D1 through the synchronization member 72. Specifically, through engagement between the first part 78 of the synchronization member 72 and the engaging feature 152 of the second rail 24, the second rail 24 and the third rail 26 can be synchronously moved.

As shown in FIG. 14 and FIG. 15, when the second rail 24 and the third rail 26 are synchronously moved relative to the first rail 22 along the first direction D1 to be close to a first predetermined position P1, the second part 80 of the synchronization member 72 contacts a portion of the contact member 38, such as the guiding part 42 (but the present invention is not limited thereto). Moreover, in response to the third rail 26 being moved relative to the first rail 22 along the first direction, the second pushing feature 94 no longer abuts against the second damping part 52 of the damping device 40 through the second component 58, such that the second damping part 52 is extended relative to the first damping part 50. In other words, the damping device 40 is in a damping ready state.

As shown in FIG. 15, FIG. 16 and FIG. 17, when the second rail 24 and the third rail 26 are further synchronously moved relative to the first rail 22 along the first direction D1 to the first predetermined position P1, the third rail 26 is no longer synchronously moved with the second rail 24 due to interaction between the synchronization member 72 and the contact member 38 of the first rail 22. Specifically, the second part 80 of the synchronization member 72 contacts the guiding part 42 of the contact member 38, such that the synchronization member 72 is deflected accordingly, and the first part 78 of the synchronization member 72 is disengaged from the engaging feature 152 of the second rail 24. Therefore, the third rail 26 is no longer synchronously moved with the second rail 24 along the first direction D1. Preferably, at least one of the guiding part 42 and the second part 80 of the synchronization member 72 has an inclined surface or an arc surface, in order to assist the synchronization member 72 in deflecting.

As shown in FIG. 18 and FIG. 19, when the second rail 24 and the third rail 26 are no longer synchronously moved, the second rail 24 and the third rail 26 can be further moved relative to the first rail 22 along the first direction D1 independently (or individually). Wherein, when the third rail 26 is further moved from the first predetermined position P1 along the first direction D1, the second section 88 of the fastening member 74 contacts a portion of the contact member 38 of the first rail 22, such as the guiding part 42. In addition, the first pushing feature 92 of the third rail 26 can push the first damping part 50 of the damping device 40 through the first component 56, such that the second damping part 52 is gradually retracted relative to the first damping part 50 for providing a damping effect to the third rail 26 and/or the second rail 24. In particular, the user can aware that the third rail 26 is going to be in a fully extended state relative to the first rail 22 according to the damping effect.

As shown in FIG. 19, FIG. 20 and FIG. 21, when the third rail 26 is further moved relative to the first rail 22 along the first direction D1 to be close to a second predetermined position P2, the fastening member 74 is deflected due to interaction between the fastening member 74 and the contact member 38 of the first rail 22. Specifically, the second section 88 of the fastening member 74 contacts the guiding part 42 of the contact member 38, such that the fastening member 74 is deflected accordingly to allow the second section 88 of the fastening member 74 to cross the guiding part 42 of the contact member 38. Preferably, at least one of the guiding part 42 and the second section 88 of the fastening member 74 has an inclined surface or an arc surface, in order to assist the second section 88 of the fastening member 74 in crossing the guiding part 42 of the contact member 38. Moreover, when the fastening member 74 is deflected, the elastic leg 90b of the second elastic member 90 accumulates an elastic force. In addition, the first pushing feature 92 of the third rail 26 further pushes the first damping part 50 of the damping device 40 through the first component 56, such that the second damping part 52 can be further retracted relative to the first damping part 50.

Figure 22:
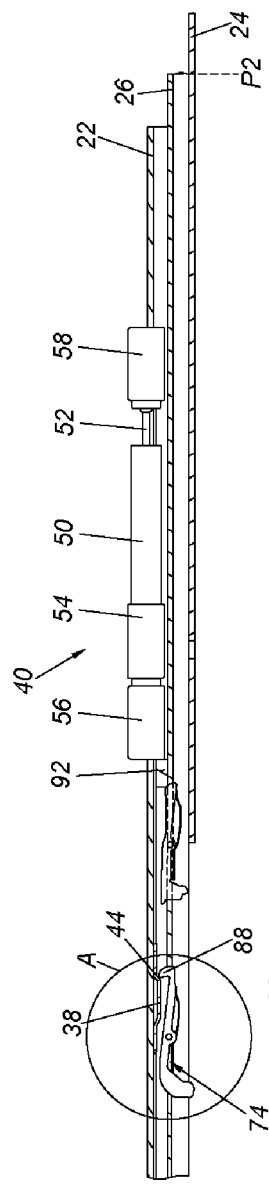
FIG. 22 is a diagram showing a fastening member of the third rail of the slide rail assembly being temporarily fastened to a contact member of the first rail, and the second rail being moved relative to the first rail and the third rail along the first direction according to an embodiment of the present invention.
Figure 23:
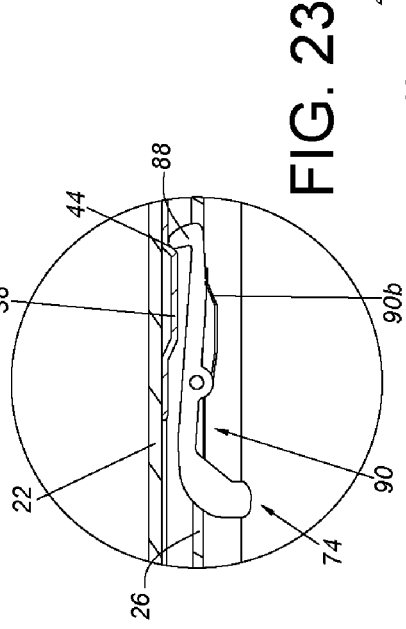
FIG. 23 is an enlarged view of an area A of FIG. 22.

As shown in FIG. 21, FIG. 22 and FIG. 23, when the third rail 26 is further moved relative to the first rail 22 along the first direction D1 to the second predetermined position P2, the fastening member 74 is temporarily fastened to the contact member 38 (such as the second section 88 of the fastening member 74 being temporarily fastened to the abutting part 44 of the contact member 38) in order to prevent the third rail 26 from being retracted relative to the first rail 22 along a second direction D2 (such as a retracted direction). In addition, the first pushing feature 92 of the third rail 26 can further push the first damping part 50 of the damping device 40 through the first component 56, such that the second damping part can be further retracted relative to the first damping part 50 to the limit.

Figure 24:
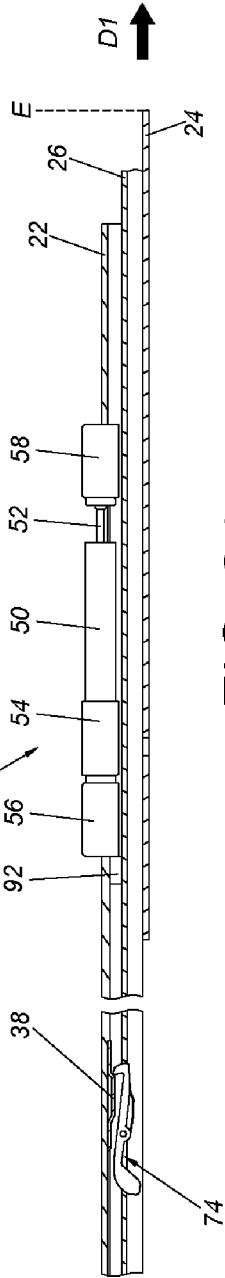
FIG. 24 is a diagram showing the second rail of the slide rail assembly being further moved relative to the first rail and the third rail along the first direction according to an embodiment of the present invention.

As shown in FIG. 24, when the third rail 26 is located at the second predetermined position P2, the second rail 24 can be further moved relative to the third rail 26 and/or the first rail 22 along the first direction D1 to an open position E (or an extension position), so as to fully open the slide rail assembly 20.

As shown in FIG. 25 and FIG. 26, when the second rail 24 is located at the open position E relative to the third rail 26 and/or the first rail 22, the working member 106 is blocked by the blocking feature 96 of the third rail 26, in order to prevent the second rail 24 from being moved from the open position E along the second direction D2 (such as the retracted direction). In such state, the user can apply the force F to the releasing member 108 or the operating member 104 in order to move the working member 106 to be no longer blocked by the blocking feature 96.

As shown in FIG. 27 and FIG. 28, when the operating member 104 is operated, the releasing member 108 is driven to deflect the working member 106 through the driving part 146, such that the working member 106 is no longer blocked by the blocking feature 96. In other words, the second rail 24 is movable relative to the third rail 26 and/or the first rail 22 from the open position E along the second direction D2.

As shown in FIG. 29, FIG. 30 and FIG. 31, during a process of the second rail 24 being moved relative to the third rail 26 and/or the first rail 22 from the open position E along the second direction D2, a portion of the second rail 24 (such as the rear part 101b of the second rail 24) is configured to contact the first section 86 of the fastening member 74 (please refer to FIG. 31).

As shown in FIG. 31, FIG. 32 and FIG. 33, during the process of the second rail 24 being further moved along the second direction D2, the rear part 101b of the second rail 24 can drive the fastening member 74 through the first section 86 in order to disengage the second section 88 of the fastening member 74 from the abutting part 44 of the contact member 38, such that the third rail 26 is movable relative to the first rail 22 along the second direction D2.

As shown in FIG. 34, during a process of the third rail 26 and the second rail 24 being moved relative to the first rail 22 along the second direction D2, the second pushing feature 94 of the third rail 26 pushes the second damping part 52 of the damping device 40 through the second component 58 for providing a damping effect to the third rail 26 and/or the second rail 24. In particular, the user can aware that the third rail 26 is going to be in a fully retracted state relative to the first rail 22 according to the damping effect.

As shown in FIG. 35 and FIG. 36, during the process of the second rail 24 (and the third rail 26) being further moved relative to the first rail 22 along the second direction D2, the guiding feature 120 of the locking member 102 is configured to abut against a second side S2 of the blocking structure 36 of the first rail 22.

As shown in FIG. 36 and FIG. 37, when the second rail 24 (and the third rail 26) is further moved relative to the first rail 22 along the second direction D2 to be close to the retracted position R, the locking member 102 is deflected by the blocking structure 36, so as to allow the guiding feature 120 of the locking member 102 to cross the second side S2 of the blocking structure 36. Preferably, in addition to the guiding feature 120 of the locking member 102, the blocking structure 36 also has a guiding feature 154. Through interaction between the guiding features 120, 154 (such as two inclined surfaces or arc surfaces abutting against each other), the locking member 102 can easily cross the second side S2 of the blocking structure 36. Moreover, after the guiding feature 120 of the locking member 102 crosses the second side S2 of the blocking structure 36, the locking part 150 of the locking member 102 abuts against the first side S1 of the blocking structure 36 of the first rail 22 once again in response to the elastic force of the elastic part 116 of the supporting structure 110. That is, the second rail 24 (and the third rail 36) can be held at the retracted position R relative to the first rail 22 once again (as shown in FIG. 7 and FIG. 8). For simplification, no further illustration regarding the slide rail assembly 20 being in the retracted state is provided.

Therefore, the slide rail assembly of the present invention is characterized in that:

1. The synchronization member 72 and the fastening member 74 are pivoted to the third rail 26 respectively by the first shaft member 72 and the second shaft member 84, and are spaced from each other. According to such arrangement, the synchronization member 72 and the fastening member 72 can be independently mounted to the third rail, and can be operated independently as well. Preferably, the first elastic member 82 and the second elastic member 90 can apply elastic forces to the synchronization member 72 and the fastening member 74 respectively. Wherein, the third rail 26 is synchronously moved (or opened) with the second rail 24 relative to the first rail 22 along the first direction D1 through the synchronization member 72. When the synchronization member 72 interactively works with the contact member 38, the third rail 26 is no longer synchronously moved with the second rail 24. On the other hand, the fastening member 74 can be temporarily fastened to the contact member 38 in order to prevent the third rail 26 from being retracted relative to the first rail 22 along the second direction D2.

2. The first pushing feature 92 and the second pushing feature 94 of the third rail 26 are respectively located at the two sides of the damping device 40. Therefore, during the process of the third rail 26 being opened relative to the first rail 22 along the first direction D1 or during the process of the third rail 26 being retracted relative to the first rail 22 along the second direction D2, the damping device 40 is configured to provide damping effect. Thereby, the damping device 40 has a two-way damping function.

3. When the second rail 24 is located at the retracted position R relative to the first rail 22, the locking member 102 abuts against the blocking structure 36 in order to prevent the second rail 24 (and the third rail 26) from being moved or opened relative to the first rail 22 from the retracted position R along the first direction D1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
a first rail;
a second rail movable relative to the first rail;
a third rail movably mounted between the first rail and the second rail, the third rail comprising a first wall, a second wall and a side wall connected between the first wall and the second wall, a height direction of the side wall passing the first wall and the second wall, and the height direction of the side wall being perpendicular to an extending direction of the third rail;
a contact member mounted to the first rail;
a synchronization member rotatably mounted to the third rail by a first shaft member, an extending direction of the first shaft member being parallel to the height direction of the side wall; and
a fastening member rotatably mounted to the third rail by a second shaft member, an extending direction of the second shaft member being parallel to the height direction of the side wall;
wherein when the second rail is moved from a retracted position along an opening direction, the third rail is synchronously moved with the second rail relative to the first rail along the opening direction through the synchronization member, and when the second rail and the third rail are moved to a first predetermined position, the third rail is no longer synchronously moved with the second rail due to interaction between the synchronization member and the contact member;
wherein when the third rail is moved from the first predetermined position to a second predetermined position along the opening direction, the fastening member is configured to be fastened to the contact member, in order to prevent the third rail from being retracted relative to the first rail along a retracted direction.

2. The slide rail assembly of claim 1, wherein the synchronization member is pivoted to the third rail by the first shaft member, the synchronization member has a first part and a second part respectively located at two sides of the first shaft member, the first part is configured to engage with the second rail; when the second rail and the third rail are moved to the first predetermined position, the second part contacts the contact member to deflect the synchronization member in order to disengage the first part from the second rail.

3. The slide rail assembly of claim 1, further comprising a first elastic member configured to apply an elastic force to the synchronization member.

4. The slide rail assembly of claim 1, wherein the fastening member is pivoted to the third rail by the second shaft member, the fastening member has a first section and a second section respectively located at two sides of the second shaft member, and the second section is configured to be fastened to the contact member.

5. The slide rail assembly of claim 1, further comprising a second elastic member configured to apply an elastic force to the fastening member.

6. The slide rail assembly of claim 1, further comprising a damping device mounted to the first rail, wherein the third rail comprises a first pushing feature and a second pushing feature respectively located at two sides of the damping device, and the first pushing feature and the second pushing feature of the third rail are configured to push the damping device along the opening direction and the retracted direction respectively, in order to allow the damping device to provide damping effect.

7. The slide rail assembly of claim 1, wherein the third rail comprises a blocking feature, the slide rail assembly further comprises a working member movably mounted to the second rail, when the third rail is located at the second predetermined position and the second rail is located at an open position relative to the third rail, the working member is blocked by the blocking feature in order to prevent the second rail from being moved from the open position along the retracted direction.

8. The slide rail assembly of claim 7, wherein the working member is pivoted to the second rail, the slide rail assembly further comprises a base and a releasing member, the base has an elastic part for providing an elastic force to the working member, and the releasing member is operatively connected to the working member and configured to deflect the working member to be no longer blocked by the blocking feature.

9. The slide rail assembly of claim 8, wherein when the working member is operated to be no longer blocked by the blocking feature, and the second rail is moved relative to the third rail from the open position along the retracted direction, the second rail is configured to disengage the fastening member from the contact member, for allowing the third rail to be moved relative to the first rail along the retracted direction.

10. The slide rail assembly of claim 1, further comprising a blocking structure and a locking member, wherein the blocking structure is mounted to the first rail, and the locking member is configured to abut against the blocking structure, in order to prevent the second rail from being moved relative to the first rail from the retracted position along the opening direction.

11. The slide rail assembly of claim 10, further comprising an operating member configured to be operated to disengage the locking member from the blocking structure, for allowing the second rail to be moved relative to the first rail along the opening direction.

12. The slide rail assembly of claim 11, wherein the locking member comprises a first feature, the operating member is movable relative to the second rail and comprises a second feature, the operating member is configured to drive the locking member to move through interaction between the first feature and the second feature, in order to disengage the locking member from the blocking structure.

13. The slide rail assembly of claim 10, further comprising a supporting structure having an elastic part for providing an elastic force to the locking member, wherein when the second rail is located at the retracted position, the locking member is held to abut against the blocking structure in response to the elastic force of the elastic part.

14. The slide rail assembly of claim 10, wherein at least one of the blocking structure and the locking member comprises a guiding feature to assist the locking member in crossing the blocking structure when the second rail is retracted relative to the first rail.

15. A slide rail assembly, comprising:
a first rail;
a second rail movable relative to the first rail;
a third rail movably mounted between the first rail and the second rail, the third rail comprising a first wall, a second wall and a side wall connected between the first wall and the second wall, a height direction of the side wall passing the first wall and the second wall, and the height direction of the side wall being perpendicular to an extending direction of the third rail;

a synchronization member pivoted to the third rail by a first shaft member, an extending direction of the first shaft member being parallel to the height direction of the side wall; and a fastening member pivoted to the third rail by a second shaft member, an extending direction of the second shaft member being parallel to the height direction of the side wall;

wherein the synchronization member is configured to engage with the second rail to allow the third rail to be synchronously moved with the second rail relative to the first rail along a first direction; when the second rail and the third rail are moved to a first predetermined position, the third rail is no longer synchronously moved with the second rail due to interaction between the synchronization member and the first rail;

wherein when the third rail is moved from the first predetermined position to a second predetermined position along the first direction, the fastening member is configured to be fastened to the first rail, in order to prevent the third rail from being moved relative to the first rail along a second direction.

16. The slide rail assembly of claim 15, wherein the synchronization member has a first part and a second part respectively located at two sides of the first shaft member, the first part is configured to engage with the second rail; when the second rail and the third rail are moved to the first predetermined position, the second part contacts the first rail to deflect the synchronization member in order to disengage the first part from the second rail.

17. The slide rail assembly of claim 15, further comprising a first elastic member configured to apply an elastic force to the synchronization member.

18. The slide rail assembly of claim 15, wherein the fastening member has a first section and a second section respectively located at two sides of the second shaft member, and the second section is configured to be fastened to the first rail.

19. The slide rail assembly of claim 15, further comprising a second elastic member configured to apply an elastic force to the fastening member.

20. The slide rail assembly of claim 15, further comprising a damping device mounted to the first rail, wherein the third rail comprises a first pushing feature and a second pushing feature respectively located at two sides of the damping device.

* * * * *